(12) United States Patent
Kim et al.

(10) Patent No.: US 10,851,229 B2
(45) Date of Patent: Dec. 1, 2020

(54) RESIN COMPOSITION FOR AN EXTERIOR MATERIAL OF VEHICLE AND MOLDED PRODUCT FOR VEHICLE INCLUDING THE SAME

(71) Applicants: Hyundai Motor Company, Seoul (KR); Kia Motors Corporation, Seoul (KR); LG Hausys, Ltd., Seoul (KR); LG Chem, Ltd., Seoul (KR)

(72) Inventors: Hyun Kyung Kim, Gyeonggi-Do (KR); Hee Joon Lee, Seoul (KR); Jin Mi Jung, Daejeon (KR); Jae Jung Yoo, Daejeon (KR); Se Jeon Lee, Chungcheongbuk-Do (KR); Chun Ho Park, Chungcheongbuk-Do (KR)

(73) Assignees: Hyundai Motor Company, Seoul (KR); Kia Motors Corporation, Seoul (KR); LG Hausys, Ltd., Seoul (KR); LG Chem, Ltd., Seoul (KR)

(*) Notice: Subject to any disclaimer, the term of this patent is extended or adjusted under 35 U.S.C. 154(b) by 119 days.

(21) Appl. No.: 16/162,706

(22) Filed: Oct. 17, 2018

(65) Prior Publication Data
US 2019/0194439 A1 Jun. 27, 2019

(30) Foreign Application Priority Data
Dec. 26, 2017 (KR) .......................... 10-2017-0179700

(51) Int. Cl.

| | |
|---|---|
| *C08L 23/16* | (2006.01) |
| *C08K 5/3417* | (2006.01) |
| *B29C 65/08* | (2006.01) |
| *B29C 65/16* | (2006.01) |
| *B29C 65/00* | (2006.01) |
| *C08K 7/00* | (2006.01) |
| *B60R 19/24* | (2006.01) |
| *C08K 5/00* | (2006.01) |
| *C08K 3/34* | (2006.01) |
| *C08L 53/00* | (2006.01) |
| *B29K 105/16* | (2006.01) |
| *B29K 105/00* | (2006.01) |
| *B29L 31/30* | (2006.01) |
| *B60R 19/03* | (2006.01) |

(52) U.S. Cl.
CPC .............. *C08L 23/16* (2013.01); *B29C 65/08* (2013.01); *B29C 65/1603* (2013.01); *B29C 66/71* (2013.01); *B29C 66/73366* (2013.01); *C08K 5/3417* (2013.01); *C08K 7/00* (2013.01); *B29K 2105/0032* (2013.01); *B29K 2105/16* (2013.01); *B29K 2823/16* (2013.01); *B29K 2995/0082* (2013.01); *B29K 2995/0089* (2013.01); *B29L 2031/3044* (2013.01); *B60R 19/03* (2013.01); *B60R 19/24* (2013.01); *C08K 3/34* (2013.01); *C08K 5/0041* (2013.01); *C08K 2201/016* (2013.01); *C08L 53/00* (2013.01)

(58) Field of Classification Search
CPC ....................................................... C08L 23/16
See application file for complete search history.

(56) References Cited

U.S. PATENT DOCUMENTS 9,175,158 B2 * 11/2015 Shimano ................. C08L 23/12

FOREIGN PATENT DOCUMENTS

JP 2002080659 A * 3/2002

OTHER PUBLICATIONS

Machine translation of JP 2002-080659 A, published Mar. 19, 2002. (Year: 2002).*

* cited by examiner

*Primary Examiner* — Vickey Nerangis
(74) *Attorney, Agent, or Firm* — Mintz Levin Cohn Ferris Glovsky and Popeo, P.C.; Peter F. Corless

(57) ABSTRACT

Disclosed is a resin composition for an exterior material of a vehicle. The resin composition may include an amount of about 40 to 90 parts by weight of polypropylene resin having a melt index of about 70 to 110 g/10 min; an amount of about 10 to 40 parts by weight of an olefin block copolymer including an ethylene-based repeating unit and a α-olefin-based repeating unit having 4 to 30 carbon atoms; an amount of about 10 to 20 parts by weight of needle-shaped inorganic filler having an aspect ratio of about 5 to 10; and an 0.01 to 5 parts by weight of laser-transmitting black colorant, wherein all the parts by weights based on 100 parts by weight of the resin composition. In particular, an average transmittance may range from about 0.01 to about 1% or less in a wavelength of about 380 to 700 nm, and an average transmittance may range from about 15% or greater and less than about 100% in a wavelength of about 800 to 1200 nm.

10 Claims, 1 Drawing Sheet

RESIN COMPOSITION FOR AN EXTERIOR MATERIAL OF VEHICLE AND MOLDED PRODUCT FOR VEHICLE INCLUDING THE SAME

CROSS-REFERENCE TO RELATED APPLICATION

This application claims under 35 U.S.C. § 119(a) the benefit of priority to Korean Patent Application No. 10-2017-0179700 filed on Dec. 26, 2017, the entire contents of which are incorporated herein by reference.

TECHNICAL FIELD

The present invention relates to a resin composition for an exterior material of a vehicle and a molded product for a vehicle including the same.

BACKGROUND

As environment-friendly regulations and improvement in fuel efficiency in a transportation means, for example, parts of a vehicle is increased, dimensional stability of materials and requirements for mechanical properties have been increasingly strengthened to meet a reduction in specific gravity of interior and exterior materials of a vehicle and a reduction in thickness of parts. In order to bond between the lightweight parts, conventionally, mechanical fastening by fastening parts (e.g., bolts, rivets, etc.), bonding by an adhesive, vibration fusion, ultrasonic fusion and the like have been used for bonding resin parts. In particular, a molded product for an exterior material such as a thinned bumper may have improved impact strength and bending property by adjusting a shape and a size of an inorganic filler. However, if pressure and heat of a predetermined level are not well controlled during a process of fastening additional parts to the molded product, an appearance of the thinned exterior material may be additionally damaged.

For example, in the related arts, the ultrasonic fusing method has been used to bond a holder part of a front or rear sensor attached to an inner surface of the existing bumper. However, since the appearance of the thinned bumper may be damaged when the ultrasonic fusing method is applied on the thinned bumper for lightweight, such method may be difficult to apply on a bumper of a certain thickness or less. A laser fusing method may be an alternative method to overcome the problems. For example, the laser fusing method can obtain the strength equal to or higher than that of the conventional technique and reduce an influence on an exterior portion due to vibration and heat, such that bond between parts may be thinned in order to save energy, improve productivity, and reduce weight. There is a need to develop a new resin composition with excellent physical properties to which the laser fusing method can be applied.

The laser fusing method irradiates a laser so that the laser transmits an upper transmission layer, for example, a transmitting material. The transmitted laser melts an interface part of an absorption layer, for example, an absorber, pressurizes a transmission layer and the absorption layer while being melted to transfer fusion heat of the absorption layer to the transmission layer, such that the interface part is solidified fast after the completion of the laser irradiation or the movement of the beam together with the melting, thereby completing the bonding. As the irradiated energy is increased, the melting pool (melting region) is formed to a large extent, which makes the bonding of the interface firm. However, if the energy exceeds a certain level, the fused area is increased and then the decomposition or deformation of the material may occur. On the other hand, the ultrasonic fusing method applies a pressure and mechanical vibration energy of an ultrasonic wave frequency band to materials to generate a friction heat on a contact surface of the materials, which instantaneously raises a temperature of the surface of the material to be a temperature at which plastic deformation takes place to bond molecules, thereby implementing the bonding.

The ultrasonic fusing method has been mostly used for bonding between an outer case of the bumper and a molding material for rear or front sensing sensor holders. However, as the conventional ultrasonic fusing method may deform the appearance of the bumper due to the heat applied by the friction and the large pressure of an instrument, a thickness of the molding material for the bumper which can be fused by the ultrasonic wave may not be sufficiently thin, for example, the thickness may be at least 2.8 mm. In the related arts, there has been a limit to additionally thinning and applying the vehicle bumper for the lightweight of the transportation means, for example, the vehicle. The laser fusing method can achieve a bonding strength similar to that of the ultrasonic fusing method and perform the fusion in a non-contact manner with respect to an energy source in addition to the pressure of the instrument for the contact between the materials to relatively reduce the deformation of the materials. Accordingly, the laser fusing method may be an alternative method to solve the problems.

The above information disclosed in this Background section is only for enhancement of understanding of the background of the invention and therefore it may contain information that does not form the prior art that is already known in this country to a person of ordinary skill in the art.

SUMMARY OF THE INVENTION

In preferred aspects, the present invention provides a resin composition for an exterior material of a vehicle. In particular, the resin composition may have transmit light at certain wavelength such a light amplification by stimulated emission of radiation (laser) such that it may perform laser fusion. In addition, the resin composition may have mechanical physical properties such as impact strength and flexural modulus and excellent workability.

In one aspect, the present invention provides a resin composition for an exterior material of a vehicle. The resin composition may include: an amount of about 40 to 90 parts by weight of polypropylene resin having a melt index of about 70 to 110 g/10 min; an amount of about 10 to 40 parts by weight of olefin block copolymer including an ethylene-based repeating unit and a α-olefin-based repeating unit having 4 to 30 carbon atoms; an amount of about 10 to 20 parts by weight of an inorganic filler having an aspect ratio of about 5 to 10 according to the following Equation 1; and an amount of about 0.01 to 5 parts by weight of laser-transmitting black colorant. All the parts by weights are based on 100 parts by weight of the resin composition, $$\text{Aspect ratio} = \text{average length/average diameter.} \quad \text{[Equation 1]}$$

Preferably, the inorganic filler may have a needle shape or a fiber shape.

An average transmittance in a wavelength of about 380 to 700 nm may range from about 0.01 to 1% or less i, and an average transmittance in a wavelength band of about 800 to 1200 nm may range from 15% or greater and less than 100%.

Typically, a transmittance can be measured by a fraction (ratio) of a radiant energy or intensity of light after passing through a substance or surface of the substance to a radiant energy or intensity of light received on the substance or the surface of the substance before the light passes through the substance. The transmittance is measured at a range of the wave length (e.g., visible light or infra-red radiation), or at a certain wavelength to measure the absorbance of the light (e.g., 810 nm, 915 nm, 940 nm, 980 nm, and 1064 nm).

Preferably, the transmittance may range from about 10% or greater and less than 100% when a laser in wavelengths of about 810 nm, about 915 nm, about 940 nm, about 980 nm, and about 1064 nm, respectively, is irradiated.

The laser-transmitting black colorant may suitably be selected from the group consisting of a phthalocyanine-based dye, a dioxazine-based dye, and a benzoimidazolone-based dye and a combination thereof.

The polypropylene resin may suitably include an ethylene-propylene copolymer, and the ethylene-propylene copolymer may include one or more ethylene repeating units and one or more propylene repeating units.

The one or more ethylene repeating units may include an amount of about 3 to 10 parts by weight based on 100 parts by weight of the ethylene-propylene copolymer.

Preferably, a weight average molecular weight of the polypropylene resin may range from about 50,000 to about 500,000 g/mol.

The inorganic filler may suitably include wollastonite. The term "wollastonite" as used herein refers to a material that contains calcium inosilicate mineral (e.g., $CaSiO_3$) as a main component, e.g, greater than about 50 wt %, greater than about 60 wt %, greater than about 70 wt %, greater than about 80 wt %, greater than about 90 wt %, greater than about 95 wt %, or greater than about 99 wt % of the total weight of the material. The wollastonite may not react with the other resin component, or vary properties of the resin component as being included in the resin composition of the invention.

The resin composition may further include: at least one of an antioxidant, a UV stabilizer, a flame retardant, a colorant, a nucleating agent, a plasticizer, a heat stabilizer, a slip agent, an antistatic agent, and a foaming agent.

In another aspect, the present invention provides a molded product for a vehicle including the resin composition as described herein.

The molded product may be a sensor holder for a bumper having a thickness of about 1.5 to 2.5 mm.

The molded product may suitably have a flexural modulus of about 2000 to 3000 MPa.

The molded product may have an IZOD impact strength of about 300 to 400 J/m.

Further provided is a vehicle that may include the molded product including the resin composition described herein.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
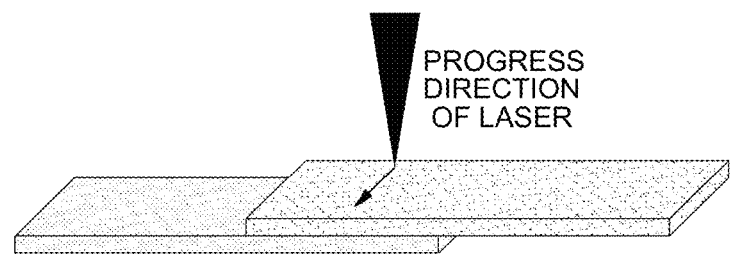
FIG. 1 showing an exemplary laser fusion process according to Experimental Example 2.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

The above and other objects, features, and advantages of the present disclosure will become more apparent from the following exemplary embodiments taken in conjunction with the accompanying drawings. However, the present disclosure is not limited to exemplary embodiments herein, but may be implemented in other forms. On the contrary, exemplary embodiments introduced herein are provided to make disclosed contents thorough and complete and sufficiently transfer the spirit of the present disclosure to those skilled in the art.

Throughout the accompanying drawings, the same reference numerals will be used to describe the same components. In the accompanying drawings, dimensions of structures are exaggerated from the actual size for the sake of clarity of the present disclosure. Terms 'first', 'second', and the like, may be used to describe various components, but the components are not to be construed as being limited by the terms. The terms are used to distinguish one component from another component. For example, a 'first' component may be named a 'second' component and the 'second' component may also be similarly named the 'first' component, without departing from the scope of the present disclosure. Singular forms used herein are intended to include plural forms unless context explicitly indicates otherwise.

Throughout this specification, it will be understood that the term "comprise" and variations thereof, such as "comprising" and "comprises", specify the presence of features, numbers, steps, operations, components, parts, or combinations thereof, described in the specification, but do not preclude the presence or addition of one or more other features, numbers, steps, operations, components, parts, or combinations thereof. In addition, it will be understood that when an element such as a layer, film, region, or substrate is referred to as being "on" another element, it can be directly on the other element or intervening elements may also be present. On the contrary, it will be understood that when an element such as a layer, film, region, or substrate is referred to as being "under" another element, it can be directly under the other element or intervening elements may also be present.

The terminology used herein is for the purpose of describing particular embodiments only and is not intended to be limiting. As used herein, the singular forms "a," "an" and "the" are intended to include the plural forms as well, unless the context clearly indicates otherwise.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a resin composition for an exterior material of a vehicle according to an embodiment of the present invention and a molded product for a vehicle including the same will be described.

Transportation means refers to a means used for transportation of goods, persons, and the like. The transportation means include, for example, terrestrial vehicles, maritime vehicles, and aerial vehicles. The terrestrial vehicles may include, for example, vehicles including passenger cars, vans, trucks, trailer trucks, sports cars, and the like, bicycles, motorcycles, trains, and the like. The maritime vehicles may include, for example, ships, submarines, and the like. The aerial vehicles may include, for example, small airplanes such as an airplane, a hang glider, a hot air balloon, a helicopter, and a drone.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The resin composition for an exterior material of a vehicle according to an exemplary embodiment of the present invention may include a polypropylene resin, an olefin block copolymer, an inorganic filler, and a laser-transmitting black colorant.

The resin composition for an exterior material of a vehicle according to an exemplary embodiment of the present invention may have an average transmittance of about 0.01% or greater and 1% or less in a visible ray wavelength range of about 380 to 700 nm (nanometer). The transmittance sharply increases from about 1% or less to 1% or greater in a wavelength range of about 700 to 800 nm.

The resin composition for an exterior material of a vehicle according to an exemplary embodiment of the present invention may have an average transmittance of about 15% or greater and less than 100% in a near infrared ray wavelength range of 800 to 1200 nm (nanometer). The resin composition for an exterior material of a vehicle according to an exemplary embodiment of the present invention may suitably have transmittance of 10% or greater and less than 100% when a laser of wavelengths of about 810 nm, about 915 nm, about 940 nm, about 980 nm, and about 1064 nm, respectively, is irradiated.

The resin composition for an exterior material of a vehicle according to an exemplary embodiment of the present invention may include a laser-transmitting black colorant. The laser-transmitting black colorant may be, for example, a phthalocyanine-based dye, a dioxazine-based dye, and a benzoimidazolone-based dye.

In the present disclosure, "-based" may mean including a compound corresponding to "-".

The laser transmittance of the resin composition for an exterior material of a vehicle according to an exemplary embodiment of the present invention may range from about 0.7 to about 1 as compared with the transmittance of the resin composition not including the laser-transmitting black colorant.

The laser-transmitting black colorant may be contained in an amount of about 0.01 to 5 parts by weight based on the total weight of the resin composition for an exterior material of a vehicle. When the amount of laser-transmitting black colorant is less than the above range, for example, less than about 0.01 parts by weight, sufficient heat generation and melting may not occur and fusion may not occur. When the amount of laser-transmitting black colorant is greater than the above range, for example, greater than about 5 parts by weight, the efficiency may be reduced compared with the laser-transmissible black colorant, and the transmittance of the resin composition may be lowered.

The resin composition for an exterior material of a vehicle according to an exemplary embodiment of the present invention may include a polypropylene resin. The polypropylene resin may have a melt index of about 70 to 110 g/10 min. For example, the polypropylene resin may have a melt index of about 70 to 110 g/10 min as measured by ASTM D1238 at a temperature of about 230° C. under a load of 2.16 kg. The melt Index (MI) is a flux when a melt is extruded from a piston under a certain condition, and means an index indicating easiness of flow of the melt. The factors that have the greatest influence on the melt index are a molecular weight and a molecular weight distribution. Examples of a method of measuring a melt index are not limited, but can be measured by, for example, the ASTM D1238 method (measured at a temperature of 230° C. under a load of 2.16 g).

The polypropylene resin may be contained in an amount of about 40 to 90 parts by weight based on the total weight of the resin composition for an exterior material of a vehicle. When the amount of polypropylene resin is less than the above range, for example, less than about 40 parts by weight, the amount of the inorganic filler may increase relatively and thus the appearance of the product may be deformed during molding. When the amount of polypropylene resin is in excess of the above range, for example, greater than about 90 parts by weight, the effect of increasing the rigidity and impact resistance upon addition of the inorganic filler may be insignificant.

The polypropylene resin may suitably include at least one of a propylene homopolymer, a copolymer of propylene and ethylene or an olefin monomer having 4 to 10 carbon atoms, a block copolymer of polypropylene and ethylene-propylene rubber. The polypropylene resin includes an ethylene-propylene copolymer. The ethylene-propylene copolymer may include one or more ethylene repeating units and one or more propylene repeating units.

The ethylene repeating unit may be contained in an amount of about 3 to 10 parts by weight based on the ethylene-propylene copolymer. When the ethylene repeating unit is included within the above range, the rigidity and impact resistance of the resin composition may be improved.

A weight average molecular weight of the polypropylene resin may suitably range from about 50,000 to about 500,000 g/mol. The weight average molecular weight may mean a weight average molecular weight in terms of polystyrene measured by the GPC method. In the process of measuring the weight average molecular weight in terms of polystyrene measured by the GPC method, a detector such as a known analyzer and a refractive index detector, and an analyzing column may be used, and the known temperature condition, solvent, and flow rate may be applied. For example, the measurement conditions may include a temperature of 30° C., a chloroform solvent, and a flow rate of 1 mL/min.

The resin composition for an exterior material of a vehicle according to an embodiment of the present invention may include an olefin block copolymer. The olefin block copolymer can increase the compatibility of the polypropylene resin and the inorganic filler, thereby improving miscibility and impact strength of the resin composition for an exterior material of a vehicle.

The olefin block copolymer may be a polymer obtained by copolymerizing ethylene or propylene with α-olefin. The olefin block copolymer may suitably include a copolymer including a plurality of repeating unit blocks or segments which may be divided from each other within a polymer because physical or chemical properties such as at least one characteristic value of a content (e.g., molar fraction), crystallinity, density, or melting point of repeating derived from each of ethylene or propylene and α-olefin, respectively, may be the same or different.

The olefin block copolymer may suitably include an ethylene-based repeating unit and an α-olefin-based repeating unit having 4 to 30 carbon atoms.

The ethylene-based repeating unit may suitably include a repeating unit included in an ethylene homopolymer prepared from an ethylene compound as a monomer. The α-olefin-based repeating unit having 4 to 30 carbon atoms may suitably include at least one of 1-butene, 1-pentene, 4-methyl-1-pentene, 1-hexene, 1-heptene, 1-octene, 1-decene, 1-undecene, 1-dodecene, 1-tetradecene, 1-hexadecene, and 1-iocosene.

The olefin block copolymer may be contained in an amount of about 10 to 40 parts by weight based on the total weight of the resin composition for an exterior material of a vehicle. When the amount of olefin block copolymer is less than the above range, for example, less than about 10 parts by weight, the miscibility and impact strength of the resin composition for an exterior material of a vehicle may be reduced. When the amount of olefin block copolymer is in excess of the above range, for example, greater than about 40 parts by weight, the bending property and moldability of the resin composition for an exterior material of a vehicle may be reduced.

The melt index (measured by the ASTM D1238, at 230° C. under a load of 2.16 kg) of the olefin block copolymer may range from about 0.5 to about 10 g/10 min.

The molar ratio of the ethylene-based repeating unit and the α-olefin-based repeating unit having 4 to 30 carbon atoms may range from about 6:4 to about 7:3. The olefin block copolymer may have a weight average molecular weight of about 50,000 to about 180,000 g/mol. The molecular weight measurement method may use the weight average molecular weight in terms of polystyrene measured by the GPC method like the above-mentioned polypropylene resin.

In addition, the specific gravity of the olefin block copolymer may range from about 0.86 to about 0.87 g/cm$^3$. When the specific gravity is within the above range, for example, less than about 0.86 g/cm$^3$, the resin composition for an exterior material of a vehicle with a low specific gravity may be provided.

Preferably, the olefin block copolymer may use an ethylene-1-octene block copolymer or an ethylene-1-butene block copolymer, in which the ethylene-1-octene block copolymer has a melt index (measured by the ASTM D1238 at 230° C. under a load of 2.16 kg) of about 0.5 to 3 g/10 min, and the ethylene-1-butene block copolymer may have a melt index (measured by the ASTM D1238 at 230° C. under a load of 2.16 kg) of about 0.5 to 3 g/10 min.

The resin composition for an exterior material of a vehicle according to an exemplary embodiment of the present invention may include an inorganic filler. The inorganic filler may be added for improving the impact strength and bending property of the resin composition for an exterior material of a vehicle, and may improve characteristics of an appearance within a molded product having a thin thickness.

The inorganic filler may be a needle shape. The inorganic filler may have an aspect ratio of 5 to 10 according to the following Equation 1.

$$\text{Aspect ratio} = \text{average length/average diameter} \quad \text{[Equation 1]}$$

The needle-shaped inorganic particles contained in the inorganic filler may have a fiber shape, or bundle shape including fibers, and the aspect ratio defined by the above Equation 1 is relatively high. Accordingly, the molded product to which the needle-shaped inorganic particles are applied may not reduce in physical properties or may not cause an appearance deformation even at a relatively thin thickness.

The inorganic particles may include, for example, wollastonite. The wollastonite may have, for example, a specific gravity of about 2.7 and an average diameter of about 3 to 20 μm. Within the above range, the appearance characteristics of the molded product may be improved.

The inorganic filler may be included in an amount of about 10 to 20 parts by weight based on the total weight of the resin composition for an exterior material of a vehicle. When the amount of inorganic filler is less than the above range, for example, less than about 10 parts by weight, the effect of improving the physical properties of the resin composition for an exterior material of a vehicle is not sufficiently realized. When the amount of inorganic filler exceeds the range, for example, greater than about 20 parts by weight, the workability and appearance characteristics of the resin composition for an exterior material for a vehicle may be reduced.

In the resin composition for an exterior material for a vehicle according to an exemplary embodiment of the present invention, although a content of inorganic filler keeps high to at least about 14% by weight, the compatibility of the inorganic filler with the polypropylene may be increased by the olefin block copolymer, thereby implementing the excellent workability and appearance characteristics and preventing the mechanical physical properties from being reduced due to the breakage of the inorganic filler due to the collision between the inorganic fillers.

The resin composition for an exterior material of a vehicle according to an exemplary embodiment of the present invention may further include at least one of an antioxidant, a UV stabilizer, a flame retardant, a colorant, a nucleating agent, a plasticizer, a heat stabilizer, a slip agent, an antistatic agent, and a foaming agent.

The antioxidant may suitably include at least one of, for example, a phenol-based antioxidant, a phosphite-based antioxidant, and thiodipropionate.

The slip agent as used herein may improve scratch resistance by imparting slip property to the surface of the molded product. The slip agent may suitably include at least one of, for example, a siloxane-based slip agent, and an amide-based slip agent.

The antistatic agent as used herein may reduce static electricity caused by friction, and the addition of the additives such as the colorant may be uniform, thereby reducing the defective rate of the production process and raising the production efficiency. The antistatic agent may suitably include at least one of a low molecular weight antistatic agent, a polymeric antistatic agent, and a conductive polymeric antistatic agent.

A molded product for a vehicle according to an exemplary embodiment of the present invention may include the resin composition for an exterior material for a vehicle as described herein. The molded product for a vehicle may be produced by molding the resin composition for an exterior material of a vehicle using various molding methods such as injection molding, extrusion molding, extrusion blowing, injection blowing and profile extrusion molding according to the application purpose and post-processing methods such as a thermoforming process using the same.

The specific shape and size of the molded product for a vehicle may be determined according to the application purpose, and may be, for example, a cover structure of a part to be attached to an automobile bumper. For example, it may be a sensor holder for a bumper. More specifically, the molded product for a vehicle may include a shape such as a rear sensor holder or a front sensor holder for attachment to a bumper. Preferably, the thickness of the holder may suitably be less than about 2.8 mm or of about 1.5 to 2.5 mm.

The molded product for a vehicle according to an exemplary embodiment of the present invention may suitably have a flexural modulus of about 2000 to 3000 MPa. The molded product for a vehicle according to an exemplary embodiment of the present invention may suitably have a flexural modulus of about 2000 to 3000 MPa by, for example, the ASTM D790.

The molded product for a vehicle according to an exemplary embodiment of the present invention may suitably have an IZOD impact strength of about 300 to 400 J/m. The molded product for a vehicle according to an exemplary embodiment of the present invention may suitably have a IZOD impact strength of about 300 to 400 Em by, for example, the ASTM D256.

The resin composition for an exterior material of a vehicle according to an exemplary embodiment of the present invention may have the laser transmitting property to be able to perform the laser fusion. As such, the resin composition may be used as the exterior material of the vehicle which has the mechanical physical properties such as the impact strength and the flexural modulus and the excellent workability.

The molded product for a vehicle according to an exemplary embodiment of the present invention may include the resin composition for an exterior material of a vehicle, and may have the laser transmitting property to be able to perform the laser fusion, thereby reducing the weight of the product with the low specific gravity and making the mechanical properties such as the impact strength and the flexural modulus and the workability excellent. Further, no additional coating may be required after the laser fusion using the laser-transmitting black coloring agent.

EXAMPLE

Hereinafter, the present disclosure will be described in detail based on detailed Examples. The following Examples are only an example to help understanding of the present disclosure and the scope of the present disclosure is not limited thereto.

Resin Composition for an Exterior Material of Vehicle and Production of Molded Product Thereof (1) Preparation of Resin Composition for an Exterior Material of Vehicle According to the composition shown in the following Table 1, the respective components were mixed to prepare resin compositions for an exterior material of a vehicle according to Examples 1 to 3 and Comparative Examples 1 and 2, respectively.

(2) Production of Molded Product

The resin composition was placed in an injection molding machine and injection molded to produce a rear parking sensor holder having a thickness of 1.5 to 1.7 mm.

TABLE 1

| Division | Example 1 | Example 2 | Example 3 | Comparative Example 1 | Comparative Example 2 |
|---|---|---|---|---|---|
| A1 | 63 | 66 | 66 | 66 | 66 |
| B1 | 17 | 14 | 14 | 14 | 14 |
| C1 | 10 | 10 | 10 | 10 | 10 |
| C2 | 10 | 10 | 10 | 10 | 10 |
| D1 | 0.1 | 0.1 | 0.2 | 0 | 0 |
| D2 | 0 | 0 | 0 | 0 | 0.35 |

A1: Highly crystalline polypropylene resin, MFR (230° C., load of 216 kg), 70 to 119 g/10 min
B1: Wallastonite having an average diameter of 8 μm and an aspect ratio L (average length)/D (average diameter) of 5 to 10, a specific gravity of 2.7 g/cm$^3$
C1: Ethylene-1-octane copolymer, MFR (190° C., load of 216 kg) 5 to 10 g/10 min, specific gravity of 0.86 to 0.87 g/cm$^3$
C2: *Ethylene-1-butane copolymer, MFR (190° C., load of 216 kg) 0.5 to 3 g/10 min, specific gravity of 0.86 to 0.87 g/cm$^3$
D1: Mixture of a phthalocyanone-based dye, a dioxaxine-based dye, and a benzoimidazolon-based dye
D2: Carbon black Experimental Example 1

The physical properties of the resin compositions for an exterior material of a vehicle and the molded product thereof obtained in Examples 1 to 3 and Comparative Examples 1 and 2 were measured by the following methods and the results are shown in Table 2.

1. Specific Gravity

The specific gravity of the molded products obtained in Examples 1 to 3 and Comparative Examples 1 and 2 was measured by the ASTM D792 method which calculates a specific gravity based on a difference between a weight measured by hanging the molded product on a fine wire and a weight measured by putting the molded product in water.

2. Melt Index (g/10 Min)

The melt index of the resin composition for an exterior material of a vehicle obtained in Examples 1 to 3 and Comparative Examples 1 and 2 was measured according to the ASTM D1238 method at a temperature of 230° C. under a load of 2.16 kg.

3. Flexural Modulus (MPa)

For the molded product obtained in Examples 1 to 3 and Comparative Examples 1 and 2, test specimens having a thickness of 6.4 mm were prepared according to the ASTM D790, and the flexural modulus was measured at a speed of 10 mm/min by applying a force to the center of the test specimen.

4. Impact Strength (J/m)

For the molded products obtained in Examples 1 to 3 and Comparative Examples 1 and 2, test specimens were prepared according to the ASTM D256, and the IZOD impact strength was measured at a temperature of 23° C.

5. Transmittance (%)

For the molded products obtained in Examples 1 to 3 and Comparative Examples 1 and 2, the transmittance for each wavelength of test specimens was measured using a ultrasonic-visible light-near infrared ray (UV-Vis-NIR) spectrometer (Solid spec). The transmittance may be calculated by measuring the ratio of power transmitting the specimen to an output value of a wavelength of a laser to be used. In this case, only the transmittance for the corresponding wavelength can be obtained.

6. Whiteness (L)

Each sample was placed in a sample holder, and the color (SCI) (whiteness: L) was measured 20 times in total using a CM-2600d spectrophotometer of KONICA MINOLTA Co., to calculate an average value.

TABLE 2

| | Example | | | Comparative Example | |
|---|---|---|---|---|---|
| Division | Example 1 | Example 2 | Example 3 | Comparative Example 1 | Comparative Example 2 |
| Specific gravity | 1.01 | 1 | 1 | 1 | 1 |
| Melt Index | 40 | 40 | 40 | 40 | 40 |
| Flexural modulus | 2700 | 2200 | 2200 | 2200 | 2200 |
| IZOD impact strength | 350 | 400 | 340 | 410 | 400 |
| Transmittance @ 980 nm | 24.3 | 27.1 | 23.2 | 27.2 | 0 |
| Transmittance @ 550 nm | 0.002 | 0.002 | 0.001 | 18.7 | 0 |
| Whiteness | 31 | 32 | 30 | 75 | 27 |

As shown in the above Table 2, the molded products obtained from the resin composition for an exterior material of a vehicle of Examples 1 to 3 exhibited the flexural modulus of 2,000 MPa or more and the impact strength of 300 J/m or more even at low specific gravity, and thus the excellent mechanical properties has been obtained. In addition, the melt index exhibited 45 g/10 min, and thus the excellent workability has been obtained. The molded products had optical properties of 1% or less transmittance at visible light (at a wavelengths of 550 nm) while having the excellent resin physical properties and all the molded products of the invention maintained the transmittance of 15% or greater at a wavelength of 980 nm that is the wavelength of the laser. In Comparative Example 1, the transmittance of 15% or greater was measured in both wavelengths of 550 nm and 980 nm without the laser-transmitting colorant, and in Comparative Example 2, the laser transmitting property was not formed when carbon black was used as a colorant. As shown in the results from measuring the whiteness in each Example and Comparative Example, the whiteness of the sample including the laser-transmitting black colorant among the samples containing the same amount of Wollastonite had a level similar to the whiteness of the sample including the carbon black.

Experimental Example 2

The laser fusion was performed on the resin compositions for an exterior material of a vehicle and the molded product thereof obtained in Examples 1 to 3 and Comparative Examples 1 and 2, and the results were shown in the following Table 3.

1. Laser Fusion and Evaluation

The laser fusion evaluation was carried out using a diode laser device (ELWD-100RD, Eurovision Co.), which t oscillates a laser with a maximum power of 100 W and a wavelength of 980 nm, and a size of a focus beam thereof was 1.6 mm. The fused sample was a bar-shaped injection specimen of 12 mm in width and 125 mm in length. Specimens of 1.6 mm and 3.6 mm in thickness were prepared by using the samples of Examples and Comparative Examples as transmitting materials. Specimens for 1.6 mm and 3.6 mm thickness were prepared in the same composition for the general bumper by allowing the absorber to have the same standard as the transmitting material. Laser process conditions control power, a speed, the repetition number, and so on. FIG. 1 schematically shows a laser fusion according to Experimental Example 2. For the laser fusion evaluation, the transmitting material of the above specimen was face up and overlapped with the absorber to a width of 40 mm, and the laser fused portion having a length of 12 mm was formed in the middle of the overlapped area.

TABLE 3

| | Example | | | Comparative Example | |
|---|---|---|---|---|---|
| Division | Example 1 | Example 2 | Example 3 | Comparative Example 1 | Comparative Example 2 |
| Laser power (W) | 80 | 80 | 80 | 80 | 80 |
| Weld rate (mm/s) | 180 | 180 | 180 | 180 | 180 |
| Pass (repetition number) | 4 | 4 | 4 | 4 | 4 |
| Bonding strength | 9.2 | 11 | 8.6 | 8.8 | — |

As shown in the above Table 3, as a result of evaluating the bonding strength of the bonded samples using a shear tensile tester after the specimens of Examples 1 to 3 and Comparative Examples 1 and 2, respectively, were irradiated with a laser under the same conditions (80 W, 180 mm/s, repeated four times), all the samples according to Examples ensured the bonding strength equal to or more than that of Comparative Example 1 without the addition of the laser-transmitting black colorant. In the samples of Comparative Example 2, a laser did not transmit the samples and carbonization occurred on the surface of the samples, so that the fusion was not formed at all.

2. Laser Fusion and Evaluation: Detailed Comparison of Examples 1 and 2

The laser fusion of the resin composition for an exterior material of a vehicle obtained in Examples 1 and 2 in the above Table 1 and the molded products thereof was carried out in detail, and the processing conditions and the results thereof are shown in the following Table 4. The line energy applied per unit length on the surface according to each process condition may be summarized by the following equation 2.

Line energy (J/mm)=(average power (W))/(moving speed (mm/s))×process repetition number (pass)  [Equation 2]

TABLE 4

| Process conditions | Power (W) | Speed (mm/s) | Pass (number) | Line Energy (J/mm) | Fusion strength (MPa) Example 1 | Fusion strength (MPa) Example 2 |
|---|---|---|---|---|---|---|
| 1 | 25 | 12 | 1 | 2.08 | 7.9 | 8.5 |
| 2 | 30 | 15 | 1 | 2.00 | 7.9 | 9.0 |
| 3 | 35 | 15 | 1 | 2.33 | 8.9 | 8.5 |
| 4 | 35 | 12 | 1 | 2.92 | 8.3 | 8.2 |
| 5 | 40 | 15 | 1 | 2.67 | 8.7 | 9.3 |
| 6 | 40 | 12 | 1 | 3.33 | 9.5 | 9.1 |
| 7 | 60 | 30 | 1 | 2.00 | 8.6 | 7.9 |
| 8 | 100 | 50 | 1 | 2.00 | 7.1 | 8.7 |
| 9 | 100 | 60 | 1 | 1.67 | 6.7 | 8.3 |
| 10 | 100 | 70 | 1 | 1.43 | 4.9 | 7.2 |
| 11 | 80 | 80 | 1 | 1.00 | 5.2 | 5.4 |
| 12 | 80 | 160 | 2 | 1.00 | 5.1 | 7.9 |
| 13 | 80 | 160 | 3 | 1.50 | 7.3 | 9.5 |
| 14 | 80 | 180 | 2 | 0.89 | 3.7 | 8.7 |
| 15 | 80 | 180 | 4 | 1.78 | 9.2 | 11.0 |
| 16 | 80 | 180 | 10 | 4.44 | 8.5 | 9.3 |
| 17 | 100 | 160 | 3 | 1.88 | 9.4 | 9.1 |
| 18 | 60 | 12 | 1 | 5.00 | 6.9 | 7.3 |
| 19 | 80 | 15 | 1 | 5.33 | 7.2 | 7.3 |

Figure 2:
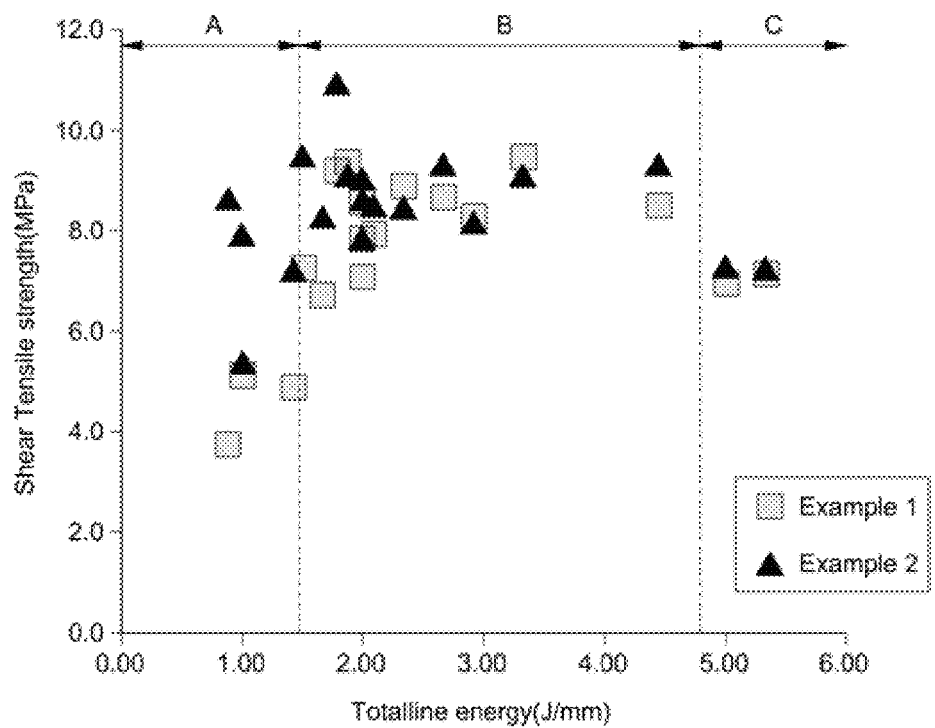
FIG. 2 is a graph showing an exemplary fusion strength distribution according to line energies of Examples 1 and 2, respectively.

FIG. 2 is a graph showing a fusion strength distribution according to line energies of Examples 1 and 2, respectively. In FIG. 2, an area A means the absorber having a thickness of 1.6 mm or less and a section in which the appearance is good, an area B means the absorber having a thickness of 3.2 m or less and a section in which the appearance is good, and an area C means a section in which the appearance of the transmitting material is deformed.

As a result of showing the distribution of the fusion strength according to the process conditions of the above Table 4, as shown in FIG. 2, as the line energy increases, the section in which the fusion strength increases is generated. As a result of confirming the deformation degree of the appearance according to the thickness of the absorber in each section, a section classified as A, B, C was formed while the fusion is formed according to energy. Moreover, both of the compositions of Examples 1 and 2 had excellent physical properties and excellent fusion characteristics, and the composition of Example 2, in which the content of the inorganic filler was relatively small, secured excellent bonding strength to the same energy. Even when both of Examples 1 and 2 use the absorber of 1.6 mm, the bonding strength corresponding to 7 to 8 MPa without deforming the appearance of the back surface of the absorber could be secured.

3. Ultrasonic Fusion and Evaluation: Comparison of Ultrasonic Fusion Strength Between Example 3 and Comparative Example 1

The laser fusion and the ultrasonic fusion were compared. As the ultrasonic welder, a product by Branson Co. was used and performed under the conditions shown in the following Table 5. Example 1 of the following Table 5 is the same as the composition of Example 3 of the above Table 1, and Example 2 of the following Table 5 is the same sample as the composition of Comparative Example 1 of the above Table 1.

TABLE 5

| Condition | Pt (Trigger pressure) | Pw (Weld pressure) | Amplitude | Time |
|---|---|---|---|---|
| A | 100 N | 200 kPa | 75% | 0.3 s |
| B | 100 N | 200 kPa | 80% | 0.3 s |
| C | 100 N | 200 kPa | 85% | 0.3 s |

TABLE 6

| Fusion condition | Bonding strength (MPa) Example 1 | Bonding strength (MPa) Example 2 |
|---|---|---|
| A | 2.8 | 2.8 |
| B | 3.5 | 3.2 |
| C | 5.2 (Appearance damage) | 3.7 (Appearance damage) |

As shown in the above Table 6, the bonding strength was improved as the energy increased in both Example 1 and Example 2, but the value was less than the value of the bonding strength according to the laser fusion as confirmed in Table 3. At this time, the laser fusion sample did not cause the appearance damage.

4. Evaluation of laser fusion of polypropylene molded product A sensor assisted system holder having a thickness of 1.6 mm and a bumper portion having a thickness of 2.5 mm were fused in the composition of Example 2 of the above Table 1. The beam was moved and irradiated so that a fused portion is formed on the plane of the holder portion in the form of a line having a length of 30 mm. As a result of the evaluation of the removal force for determining whether or not the sensor drops by the force in the vertical direction, it was confirmed that the sensor does not drop under the force of 25 kgf based on the removal force of the ultrasonic wave as the result of evaluating the removal force. Accordingly, no deformation mark was found on the back surface of the absorber (opposite side to the surface on which the fusion with the sensor molding material is generated), and the appearance of the bumper was not deteriorated.

The resin composition for an exterior material of a vehicle according to the various exemplary embodiments of the present invention may have the laser transmitting property to be able to perform the laser fusion and can be used as the exterior material of the vehicle which has the mechanical physical properties such as the impact strength and the flexural modulus and the excellent workability.

The molded product for a vehicle according to the various exemplary embodiments of the present invention may include the resin composition for an exterior material of a vehicle, and may have the laser transmitting property to be able to perform the laser fusion, thereby reducing the weight of the product with the low specific gravity and making the mechanical properties such as the impact strength and the flexural modulus and the workability substantially improved. Further, no additional coating may be required after the laser fusion using the laser-transmitting black colorant.

Although the exemplary embodiments of the present invention have been described with reference to the accompanying drawings, those skilled in the art will appreciate that various modifications and alterations may be made without departing from the spirit or essential feature of the present disclosure. Therefore, it should be understood that the above-mentioned embodiments are not restrictive but are exemplary in all aspects.

What is claimed is:

1. A molded product for an exterior material of a vehicle comprising a resin composition, wherein the resin composition comprises:
    an amount of about 40 to 90 parts by weight of a polypropylene resin having a melt index of about 70 to 110 g/10 min as measured by ASTM D1238 at a temperature of 230° C. under a load of 2.16 kg;

an amount of about 10 to 40 parts by weight of an olefin block copolymer comprising an ethylene-based repeating unit and a α-olefin-based repeating unit having 4 to 30 carbon atoms;

an amount of about 10 to 20 parts by weight of a needle-shaped inorganic filler having an aspect ratio of about 5 to 10 according to the following Equation 1; and $$\text{Aspect ratio} = \text{average length/average diameter,} \quad [\text{Equation 1}]$$

an amount of about 0.01 to 5 parts by weight of a laser-transmitting black colorant selected from the group consisting of a phthalocyanine-based dye, a dioxazine-based dye, and a benzoimidazolone-based dye and a combination thereof, wherein all the parts by weights based on 100 parts by weight of the resin composition, wherein the molded product has a thickness of about 1.5 to 2.5 mm, wherein the molded product has i) an average transmittance in a wavelength of about 380 to 700 nm ranging from about 0.01 to 1% or less, and ii) an average transmittance in a wavelength band of about 800 to 1200 nm ranging from about 15% or greater and less than 100%.

2. The product of claim 1, wherein the molded product has a transmittance that ranges from about 10% or greater and less than 100% when a laser in the wavelengths of about 810 nm, about 915 nm, about 940 nm, about 980 nm, and about 1064 nm, respectively, is irradiated.

3. The molded product of claim 1, wherein the polypropylene resin comprises an ethylene-propylene copolymer, and the ethylene-propylene copolymer comprises one or more ethylene repeating units and one or more propylene repeating units.

4. The molded product of claim 3, wherein the one or more ethylene repeating units comprise an amount of about 3 to 10 parts by weight based on 100 parts by weight of the ethylene-propylene copolymer.

5. The molded product of claim 1, wherein a weight average molecular weight of the polypropylene resin ranges from about 50,000 to about 500,000 g/mol.

6. The molded product of claim 1, wherein the inorganic filler comprises wollastonite.

7. The molded product of claim 1, further comprising:
at least one selected from an antioxidant, a UV stabilizer, a flame retardant, a colorant, a nucleating agent, a plasticizer, a heat stabilizer, a slip agent, an antistatic agent, and a foaming agent.

8. The molded product of claim 1, wherein the molded product has a flexural modulus of about 2000 to 3000 MPa.

9. The molded product of claim 1, wherein the molded product has an IZOD impact strength of about 300 to 400 J/m.

10. A vehicle comprising the molded product of claim 1.

* * * * *